United States Patent
Sakai et al.

(10) Patent No.: US 9,664,412 B2
(45) Date of Patent: May 30, 2017

(54) HEATING DEVICE

(71) Applicant: Sanden Corporation, Isesaki-shi, Gunma (JP)

(72) Inventors: Yusuke Sakai, Isesaki (JP); Hiroyuki Yokoyama, Isesaki (JP); Shinji Tagami, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 201 days.

(21) Appl. No.: 14/408,548

(22) PCT Filed: Jul. 2, 2013

(86) PCT No.: PCT/JP2013/004100
§ 371 (c)(1),
(2) Date: Dec. 16, 2014

(87) PCT Pub. No.: WO2014/013683
PCT Pub. Date: Jan. 23, 2014

(65) Prior Publication Data
US 2015/0131981 A1   May 14, 2015

(30) Foreign Application Priority Data
Jul. 18, 2012   (JP) ................. 2012-159450

(51) Int. Cl.
*F24H 1/10* (2006.01)
*H05B 3/78* (2006.01)
(Continued)

(52) U.S. Cl.
CPC ......... *F24H 1/103* (2013.01); *B60H 1/2221* (2013.01); *F24H 1/009* (2013.01); *F24H 1/102* (2013.01);
(Continued)

(58) Field of Classification Search
None
See application file for complete search history.

(56) References Cited

U.S. PATENT DOCUMENTS

| 941,215 A | * | 11/1909 | Wade ..................... F24H 1/121 |
| | | | 122/4 A |
| 1,215,748 A | * | 2/1917 | Underwood ........... F24H 1/102 |
| | | | 392/479 |

(Continued)

FOREIGN PATENT DOCUMENTS

| CN | 101213408 A | 7/2008 |
| CN | 101943087 A | 1/2011 |

(Continued)

OTHER PUBLICATIONS

Japan Patent Office; Office Action received for Japanese Patent Application No. 2012-159450, mailed May 10, 2016.

(Continued)

*Primary Examiner* — Thor Campbell
(74) *Attorney, Agent, or Firm* — Baker Botts L.L.P.

(57) ABSTRACT

Provided is a heating device which makes it possible to effectively perform heat exchange between a heating element and a heat medium without increasing the number of components, and further to eliminate air retention and increase of a pressure loss. A heating device 1 is constituted of a case 2 including therein a flow path 3 through which a heat medium flows, and an electric heating wire heater 4 disposed in the flow path of the case to heat the heat medium. The case comprises a first case section 6 and a second case section 7 each of which has at least one opened surface and which are connected to each other in a state where respective openings are made to abut on each other, and a plate-like gasket 8 which is interposed between abutment portions of the first case section and the second (Continued)

case section, and seals a space between both the case sections, and the gasket controls the flow of the heat medium in the flow path.

18 Claims, 17 Drawing Sheets

(51) Int. Cl.
| | |
|---|---|
| *H05B 3/24* | (2006.01) |
| *B60H 1/22* | (2006.01) |
| *F24H 1/00* | (2006.01) |
| *F24H 9/00* | (2006.01) |
| *F24H 9/18* | (2006.01) |
| *H05B 3/04* | (2006.01) |

(52) U.S. Cl.
CPC ......... *F24H 9/0015* (2013.01); *F24H 9/1818* (2013.01); *H05B 3/04* (2013.01); *H05B 3/24* (2013.01); *B60H 2001/2271* (2013.01); *F24H 2250/02* (2013.01); *H05B 2203/022* (2013.01)

(56) References Cited

U.S. PATENT DOCUMENTS

| | | | | |
|---|---|---|---|---|
| 2,640,138 | A * | 5/1953 | Merritt | F02N 19/10 123/142.5 E |
| 3,262,570 | A * | 7/1966 | Borsetti | B01D 29/58 210/266 |
| 3,863,021 | A * | 1/1975 | Schindler | H02G 3/085 174/53 |
| 4,201,360 | A * | 5/1980 | Schwartzburg | B29C 45/44 249/140 |
| 4,334,141 | A * | 6/1982 | Roller | A47J 31/545 219/505 |
| 4,343,988 | A * | 8/1982 | Roller | A47J 31/545 165/165 |
| 4,349,434 | A * | 9/1982 | Jaworski | B01D 35/18 210/149 |
| 4,395,618 | A * | 7/1983 | Cunningham | H05B 3/82 165/160 |
| 4,508,957 | A * | 4/1985 | Rocchitelli | B60S 1/481 137/341 |
| 5,438,642 | A * | 8/1995 | Posen | F24H 1/102 122/19.1 |
| 5,549,821 | A * | 8/1996 | Bounnakhom | B01D 27/06 210/232 |
| 6,330,395 | B1 * | 12/2001 | Wu | F24H 1/14 392/484 |
| 6,419,476 | B1 * | 7/2002 | Ouellette | B29C 45/27 425/567 |
| 6,621,984 | B2 * | 9/2003 | Castaneda | F24H 1/142 392/465 |
| 6,816,670 | B1 * | 11/2004 | Renau | F24H 1/121 392/467 |
| 6,893,561 | B2 * | 5/2005 | Jainek | B01D 29/21 148/549 |
| 6,957,013 | B2 * | 10/2005 | Zimmer | B01D 1/0017 392/397 |
| 7,015,437 | B2 * | 3/2006 | Johnston | F24H 1/162 219/653 |
| 7,088,915 | B1 * | 8/2006 | Sturm | F24H 9/2028 392/465 |
| 7,668,444 | B2 * | 2/2010 | Tsai | H05B 3/44 392/407 |
| 7,813,628 | B2 * | 10/2010 | Haan | F22B 1/288 392/397 |
| 8,107,803 | B1 * | 1/2012 | Hannah | A47J 31/4403 392/432 |
| 8,231,779 | B2 * | 7/2012 | Jokschas | B01D 27/08 123/557 |
| 8,249,437 | B2 * | 8/2012 | Commette | F24H 1/102 29/432 |
| 8,731,386 | B2 * | 5/2014 | Waechter | F24H 1/009 392/479 |
| 9,062,894 | B2 * | 6/2015 | Miyazaki | F24H 1/142 |
| 2007/0102421 | A1 * | 5/2007 | Tonomura | H05B 6/02 219/630 |
| 2007/0241100 | A1 * | 10/2007 | Stickel | A47J 31/545 219/543 |
| 2010/0296800 | A1 * | 11/2010 | Min | F24H 1/121 392/468 |
| 2011/0069943 | A1 * | 3/2011 | Luppold | B60H 1/2221 392/488 |
| 2012/0087642 | A1 * | 4/2012 | Bohlender | H05B 3/24 392/465 |

FOREIGN PATENT DOCUMENTS

| | | |
|---|---|---|
| JP | S08-016435 Y1 | 10/1933 |
| JP | 56083560 A | 7/1981 |
| JP | 60098766 A | 7/1985 |
| JP | 06049721 A | 7/1994 |
| JP | 2001235033 A | 8/2001 |
| JP | 3633329 B2 | 3/2005 |
| JP | 2009-156507 A | 7/2009 |
| JP | 2011-143781 A | 7/2011 |

OTHER PUBLICATIONS

The State Intellectual Property Office of the People's Republic of China, The First Office Action issued in Application No. CN 201380038011.2, mailed Sep. 2, 2016.

* cited by examiner

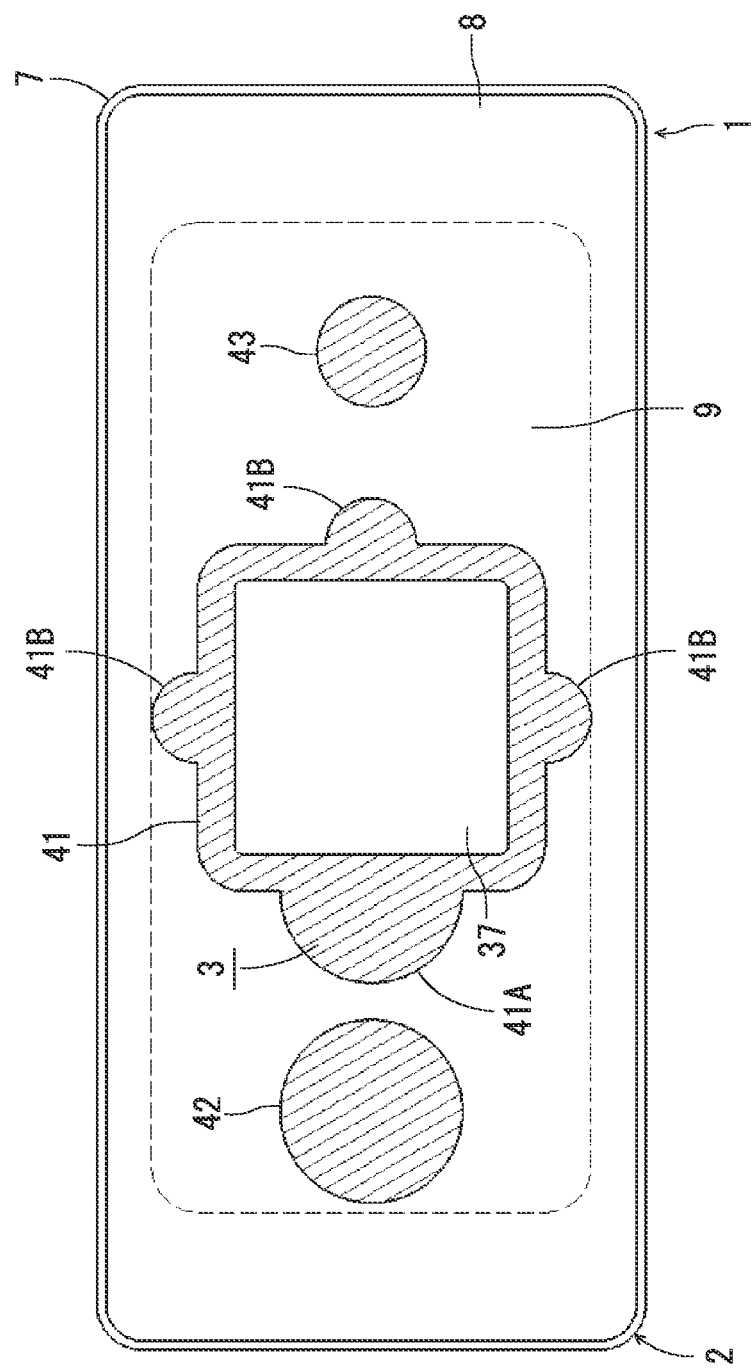

HEATING DEVICE

CROSS-REFERENCE TO RELATED APPLICATIONS

This application is a U.S. National Stage Patent Application under 37 U.S.C. §371 of International Patent Application No. PCT/JP2013/004100, filed on Jul. 2, 2013, which claims the benefit of Japanese Patent Application No. JP 2012-159450, filed on Jul. 18, 2012, the disclosures of which are incorporated herein by reference in their entirety.

TECHNICAL FIELD

The present invention relates to a heating device which heats a heat medium flowing therethrough by use of a heating element.

BACKGROUND ART

Due to actualization of environmental problems of recent years, development of hybrid cars and electric cars has been activated and spread thereof has been promoted. In each of such vehicles, waste heat of an engine which has heretofore been used for air condition in the vehicle cannot sufficiently be utilized. Therefore, a heating device using an electric heating wire heater as a heating element is mounted in the vehicle, and the heating device is used as an auxiliary heat source to compensate for the waste heat of the engine in the hybrid car, or used as a substitute heat source in place of the engine in the electric car, to heat a heat medium such as cooling water which flows through a circuit of an air conditioning device for the vehicle (e.g., see Patent Document 1).

In such a heating device, a flow path through which the heat medium flows is constituted in a case, and the heating element is disposed in this flow path to heat the heat medium. Therefore, heat exchange between the heating element and the heat medium has to be activated to improve a heating performance.

To solve the problem, in Patent Document 1 described above, the heating device is contrived so that a partition wall (a guide) is formed in an outer surface of a first case body in which the heating element is received, and the flow of the heat medium in the flow path is turned by this partition wall, to lengthen a period of time when the heat exchange between the heating element and the heat medium is performed via the first case body. In addition, the heating element is constituted in the form of a flat plate to enlarge a heat transfer area, and a plurality of through holes are further formed in this flat plate-like heating element, whereby the heat exchange is performed between the heat medium and the heating element while the heat medium successively passes through the through holes (e.g., see Patent Document 2).

CITATION LIST

Patent Documents

Patent Document 1: Japanese Patent Application Publication No. 2011-143781
Patent Document 2: Japanese Patent No. 3633329

SUMMARY OF THE INVENTION

Problems to be Solved by the Invention

However, in a system where a partition wall is formed in a case to control a flow path of a heat medium as in Patent Document 1 described above, the number of components increases, which leads to a noticeable rise of production cost. Furthermore, such a heating element as in Patent Document 2 described above raises cost by itself, and further, a pressure loss of the heat medium in the flow path disadvantageously increases. Additionally, the flow path becomes complicated, and hence there is the problem that air does not easily flow outside and is disadvantageously retained in the flow path.

The present invention has been developed to solve such a conventional technical problem, and an object thereof is to provide a heating device which makes it possible to effectively perform heat exchange between a heating element and a heat medium without increasing the number of components and further to eliminate air retention and increase of a pressure loss.

Means for Solving the Problems

To achieve the above object, a heating device of the present invention is constituted of a case including therein a flow path through which a heat medium flows, and a heating element disposed in the flow path of this case to heat the heat medium, and characterized in that the case comprises a first case section and a second case section each of which has at least one opened surface and which are connected to each other in a state where respective openings are made to abut on each other, and a plate-like gasket which is interposed between abutment portions of the first case section and the second case section, and seals a space between both the case sections. And at least a part of this gasket is positioned in the flow path, to control the flow of the heat medium in the flow path.

The heating device of the invention of claim 2 is characterized in that in the above invention, the gasket has a wall section positioned in the flow path, and a passage portion opened in this wall section.

The heating device of the invention of claim 3 is characterized in that in the above invention, in the gasket, the flow path of a portion where air is easily retained in the case is narrowed by an opening dimension and/or a shape of the passage portion formed in the wall section.

The heating device of the invention of claim 4 is characterized in that in the above invention, the gasket has cutout portions projected and formed in an upper portion of the passage portion positioned in an upper portion of the flow path.

The heating device of the invention of claim 5 is characterized in that in the invention of claim 2 to claim 4, in the gasket, the flow path of a portion where the heat medium does not easily flow in the case is enlarged by an opening dimension and/or a shape of the passage portion formed in the wall section.

The heating device of the invention of claim 6 is characterized in that in the invention of claim 2 to claim 5, the opening dimension and/or the shape of the passage portion formed in the wall section of the gasket is set so that a pressure loss of the heat medium in the flow path falls within an allowable range.

The heating device of the invention of claim 7 is characterized in that in the above respective inventions, the heating element is disposed along the space between both the case sections, and the heating element passes through the passage portion formed in the wall section of the gasket.

The heating device of the invention of claim 8 is characterized in that in the invention of claim 1 to claim 6, the heating elements are arranged in the case sections, respectively, and the gasket is positioned between the respective heating elements.

The heating device of the invention of claim 9 is characterized in that in the above respective inventions, the heat medium is an antifreezing solution which flows through a vehicle heating water circuit.

Advantageous Effect of the Invention

According to the present invention, in a heating device constituted of a case including therein a flow path through which a heat medium flows, and a heating element disposed in the flow path of this case to heat the heat medium, the case comprises a first case section and a second case section each of which has at least one opened surface and which are connected to each other in a state where respective openings are made to abut on each other, and a plate-like gasket which is interposed between abutment portions of the first case section and the second case section, and seals a space between both the case sections. And at least a part of this gasket is positioned in the flow path to control the flow of the heat medium in the flow path. Therefore, without disposing any special partition wall in the case or without subjecting the heating element to any special processing, the flow of the heat medium flowing in the case can be controlled by the gasket which seals the space between the first case section and the second case section.

In this way, the flow of the heat medium can be controlled by utilizing the gasket which seals the space between the respective case sections, and hence heat exchange between the heating element and the heat medium can effectively be performed while achieving decrease of the number of components and reduction of cost.

In this case, for example, as in the invention of claim 2, the gasket has a wall section positioned in the flow path and a passage portion opened in this wall section, and for example, as in the invention of claim 3, the flow path of a portion where air is easily retained in the case is narrowed by an opening dimension and/or a shape of the passage portion formed in the wall section of the gasket. In this case, a flow speed of the heat medium in the portion where the air is easily retained in the case can be heightened, and hence the air to be retained in the flow path can smoothly be pushed away. In consequence, generation of the air retention in the flow path of the case can effectively be prevented or inhibited.

Here, an upper portion of the flow path is a portion where the heat medium does not easily flow and where the air is also easily retained. When the flow path of this portion is narrowed to push the air to the outside as described above, the heat medium does not easily flow. However, when cutout portions are projected and formed in an upper portion of the passage portion positioned in the upper portion of the flow path as in the invention of claim 4, the heat medium can easily pass through the upper portion of such a flow path, and it is possible to decrease portions where the heat exchange between the heat medium and the heating element is not easily performed. Furthermore, the cutout portions also have an effect of decreasing a pressure loss of the heat medium.

In addition, for example, when the flow path of the portion where the heat medium does not easily flow in the case is enlarged by the opening dimension and/or the shape of the passage portion formed in the wall section of the gasket as in the invention of claim 5, the heat medium is allowed to easily flow through the portion where the heat medium does not easily flow in the case, and a flow rate of the heat medium can be uniformed. Therefore, it is possible to efficiently perform the heating of the heat medium by the heating element, and it is possible to avoid an abnormal temperature rise of the heating element.

At this time, when the opening dimension and/or the shape of the passage portion formed in the wall section of the gasket is set so that the pressure loss of the heat medium in the flow path falls within an allowable range as in the invention of claim 6, it is possible to prevent the disadvantage that the pressure loss of the heat medium in the case is excessively increased for the control of the flow of the heat medium.

Here, when the heating element is disposed along the space between both the case sections as in the invention of claim 7, the heating element passes through the passage portion formed in the wall section of the gasket, so that it is possible to execute the control of the flow of the heat medium by the gasket without hindrance.

Furthermore, when the heating elements are arranged in the case sections, respectively, as in the invention of claim 8, the gasket may be positioned in a space between the respective heating elements.

In addition, as in the invention of claim 9, the heating device of above respective inventions is disposed in a vehicle heating water circuit through which an antifreezing solution flows, to heat the antifreezing solution which is the heat medium, whereby the heating device is used as an auxiliary heat source or a substitute heat source for an engine. Consequently, it is possible to improve an air conditioning performance of an air conditioning device provided with a cooling water circuit or a vehicle on which the air conditioning device is mounted, and it is also possible to achieve reduction of cost.

BRIEF DESCRIPTION OF THE DRAWINGS

FIG. 17 is a view in which the gasket of FIG. 16 is allowed to face an end surface of the second case section of FIG. 15.

MODE FOR CARRYING OUT THE INVENTION

Figure 1:
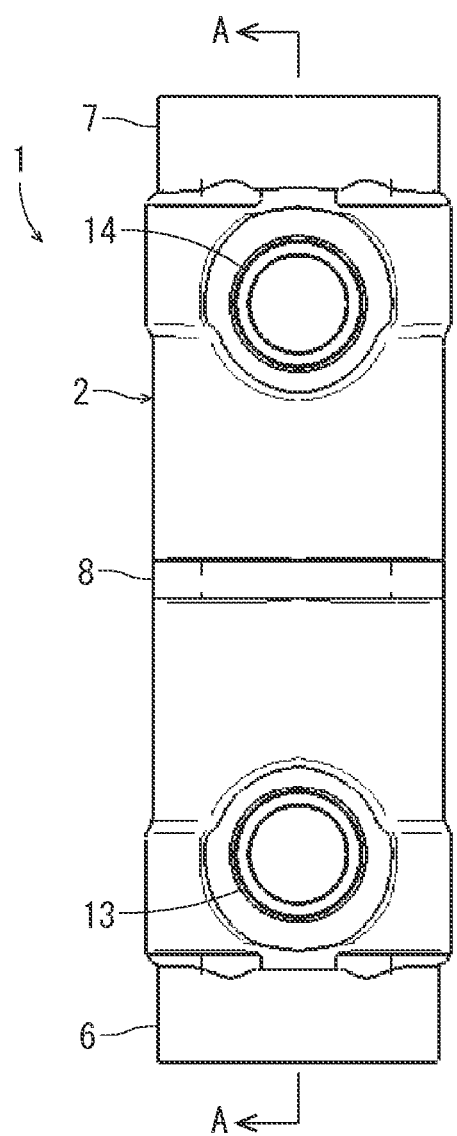
FIG. 1 is a plan view of a heating device of Embodiment 1 to which the present invention is applied.

Hereinafter, embodiments of the present invention will be described in detail with reference to the drawings.

Embodiment 1

FIG. 1 to FIG. 6 show a heating device 1 of Embodiment 1 of the present invention. As shown in the respective drawings, the heating device 1 is constituted of a case 2 in which a flow path 3 of a heat medium is constituted, and two electric heating wire heaters 4 as heating elements disposed in the flow path 3 of the case 2.

The heating device 1 of the embodiment is mounted on a vehicle such as a hybrid car or an electric car, and the heating device is used as a heat source which supplies heat so as to compensate for shortage of waste heat of an engine (the heat source) in the hybrid car, or used as a substitute heat source which supplies the heat in place of the engine which is not present in the electric car, to heat an antifreezing solution (a heat medium) or the like which flows through a water circuit (not shown) of an air conditioning device for the vehicle.

Specifically, in the hybrid car, an LLC (cooling water or an antifreezing solution) flowing through a cooling water circuit to cool the engine flows as the heat medium in the flow path 3, and is heated by the electric heating wire heaters 4. This cooling water circuit is disposed in the air conditioning device for the vehicle, and heating in the car is made possible by the LLC heated by the engine and the heating device 1.

On the other hand, in the electric car, the LLC flowing through the water circuit flows as the heat medium in the flow path 3, and is heated by the electric heating wire heaters 4. This water circuit is disposed in the air conditioning device for the vehicle in the same manner as described above, and the heating in the car is made possible by the heat of the coolant heated by the heating device 1. Furthermore, the water as the heat medium is allowed to flow through the flow path 3, and is turned into warm water by the electric heating wire heaters 4, and this warm water may be utilized as the substitute heat source in place of the engine, i.e., the heat source to heat the LLC flowing through a heating circuit of the air conditioning device for the vehicle.

Additionally, it is also considered that in either one of the hybrid car and the electric car, the heating device 1 is disposed together with an unshown heater core in the heating circuit through which the antifreezing solution flows, and the heating device 1 is utilized as one of the heat sources of the antifreezing solution, to blow the air heated by the heater core.

Next, the case 2 of the heating device 1 of the embodiment is constituted of a first case section 6 and a second case section 7 each having a rectangular container form whose one side surface is opened and which is made of a metal, and a metal gasket 8 interposed between these sections, and an opening of the first case section 6 and an opening of the second case section 7 are made to abut on each other via the gasket 8 and the respective case sections 6 and 7 are fixed to each other by unshown bolts, whereby the case is assembled. It is to be noted that each of the electric heating wire heaters 4 is inserted into the flow path 3 from an unshown opening formed in the other side surface of one of the case sections, and the opening is closed with an unshown cover.

Figure 5:
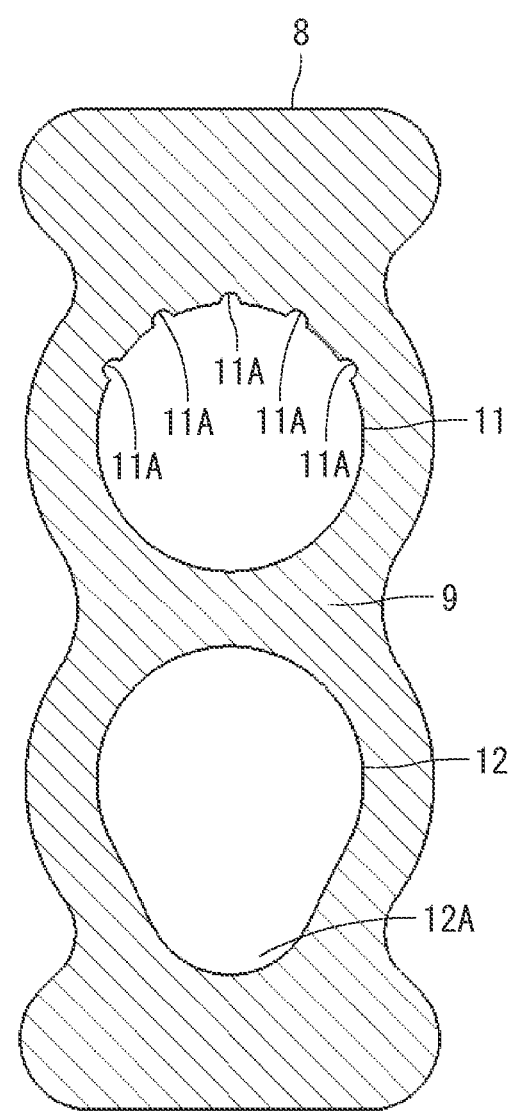
FIG. 5 is a front view of a gasket of the heating device of FIG. 1.

In this state, the gasket 8 seals a space between the respective case sections 6 and 7. Furthermore, as shown in FIG. 5, two upper and lower passage portions 11 and 12 each constituted of a through hole in the embodiment are opened and formed in a wall section 9 of the gasket 8. The electric heating wire heaters 4 pass through the passage portions 11 and 12 of the gasket 8 via predetermined spaces, respectively, and the respective heaters are disposed along the space between the first case section 6 and the second case section 7.

Figure 4:
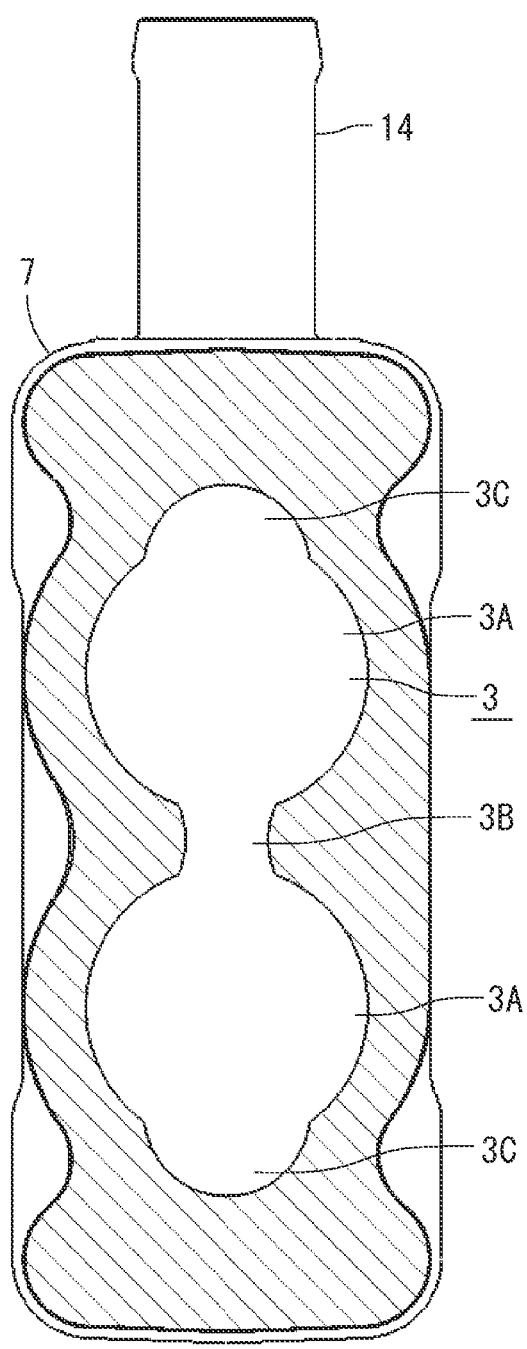
FIG. 4 is a side view of a first case section of the heating device of FIG. 1.

Furthermore, an inflow port 13 of the heat medium is formed in an upper surface of the first case section 6, and an outflow port 14 of the heat medium is formed in an upper surface of the second case section 7. In addition, the flow path 3 in the case 2 constituted of the respective case sections 6 and 7 possesses a shape formed by coupling centers of two substantially cylindrical space portions 3A by a small-width portion 3B as shown in FIG. 4, and the electric heating wire heaters 4 passed through the passage portions 11 and 12 of the gasket 8 are positioned in the space portions 3A, respectively. Furthermore, an upper surface of the upside space portion 3A and a lower surface of the downside space portion 3A are expanded to form enlarged-width sections 3C each having a semicircular cross section.

Here, in the embodiment, the attached gasket 8 is substantially positioned in the center between the inflow port 13 and the outflow port 14, and the downside passage portion 12 has a little smaller circular shape than the downside space portion 3A, and further has an enlarged-width portion 12A enlarged into a semicircular shape similar to the downside enlarged-width portion 3C. Furthermore, the upside passage portion 11 positioned in an upper portion of the flow path 3 has a slightly smaller circular shape than the upside space portion 3A, but a plurality of small-width cutout portions 11A are projected and formed in an upper portion, e.g., an upper half position of the upside passage portion to reach a circle of the space portion 3A. In addition, to constitute the predetermined space from each of the electric heating wire heaters 4 as described above, an inner diameter dimension of a circular portion of each of the passage portions 11 and 12 is set to be larger than an outer diameter of a metal pipe 21 of the electric heating wire heater 4 as much as the predetermined space.

Figure 6:
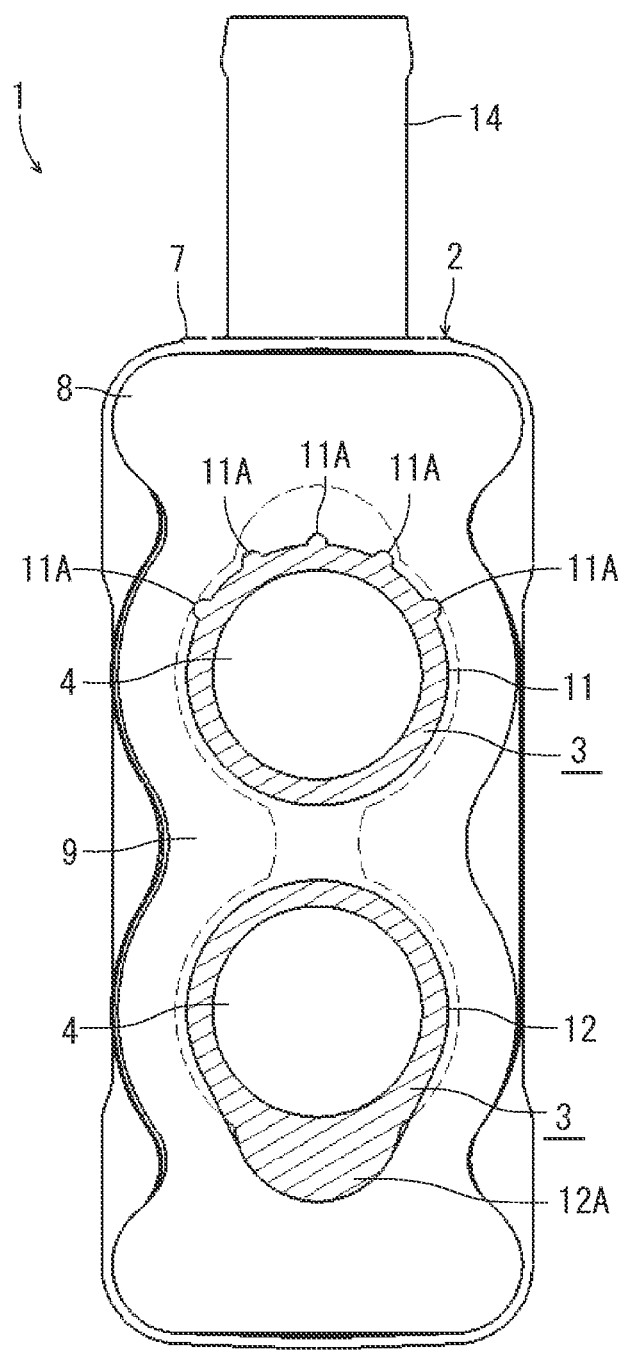
FIG. 6 is a view in which the gasket of FIG. 5 is allowed to face an end surface of the second case section of FIG. 4.

Due to such a dimensional relation, the wall section 9 of the gasket 8 is positioned to project into the flow path 3 of the case 2 from an opening end surface of each of the case sections 6 and 7, and the flow path 3 between each of the passage portions 11 and 12 and each of the electric heating wire heaters 4, 4 has such a sectional shape as shown by hatching in FIG. 6. That is, the cross section of the flow path 3 constituted in the downside passage portion 12 possesses such a shape as to surround the electric heating wire heater 4 via the predetermined space and to enlarge to the downside (the enlarged-width portion 12A). Furthermore, the cross section of the flow path 3 constituted in the upside passage portion 11 similarly possesses such a shape as to surround the electric heating wire heater 4 via the predetermined space, and a shape in which an upper half narrows and projects to the outside in a plurality of portions. Consequently, there is constituted, in the case 2, the flow path 3 of the heat medium which passes from the inflow port 13 to a space between the first case section 6 and each of the electric heating wire heaters 4 and passes through the respective passage portions 11 and 12 of the gasket 8 to reach the outflow port 14 from a space between the second case section 7 and each of the electric heating wire heaters 4.

Figure 2:
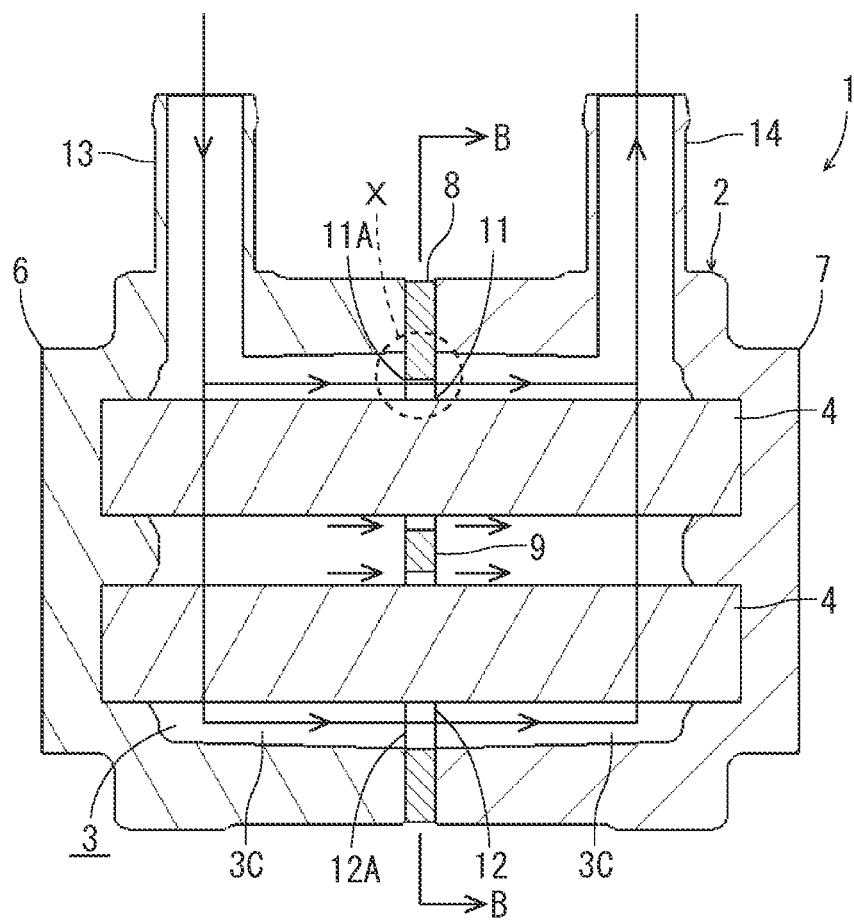
FIG. 2 is a sectional view taken along the A-A line of FIG. 1.
Figure 3:
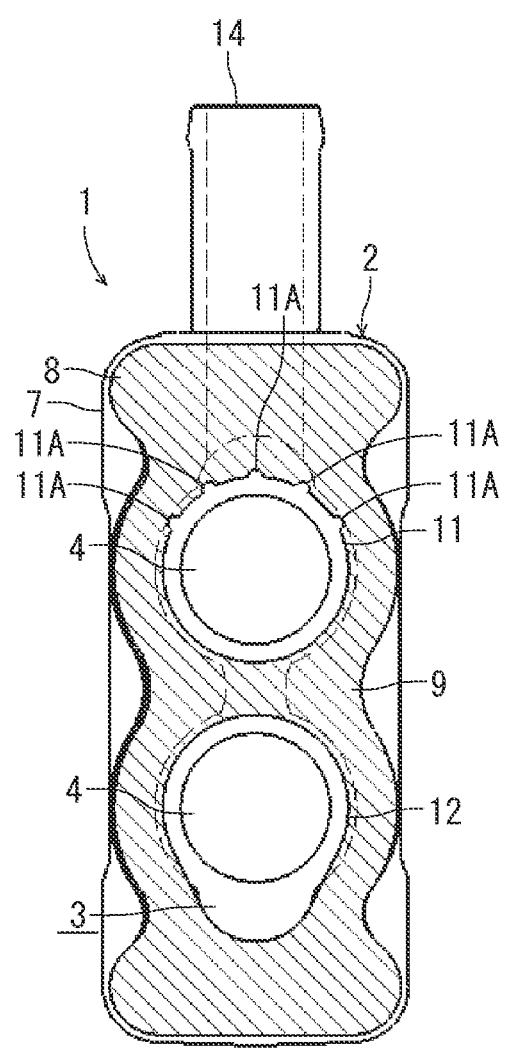
FIG. 3 is a sectional view taken along the B-B line of FIG. 2.

In the abovementioned constitution, the heat medium flows from the inflow port 13 into the flow path 3 in the case 2, passes through the flow path 3 and flows outside from the outflow port 14 by an unshown pump or the like as shown by arrows in FIG. 2. At this time, a larger part of the heat medium which flows from the upside to the inside passes around the respective electric heating wire heaters 4 in the first case section 6 from the upside to the downside due to flow energy of the heat medium, and reaches the enlarged-width portion 3C of the lower portion of the first case section 6. Afterward, the heat medium changes its direction to a gasket 8 direction, flows around the downside electric heating wire heater 4 toward the gasket 8 direction, flows through the enlarged-width portion 12A of the passage portion 12 of the gasket 8 into the second case section 7, and flows around the respective electric heating wire heaters 4 from the downside to the upside to finally flow outside from the outflow port 14. Therefore, the larger part of the heat medium which has flowed inside smoothly passes through the enlarged-width portion 12A of the enlarged gasket 8.

Furthermore, the remaining heat medium which has flowed inside from the inflow port 13 changes its direction to the gasket 8 direction due to collision with the respective electric heating wire heaters 4, or the like, flows around the respective electric heating wire heaters 4 to reach the passage portions 11 and 12 of the gasket 8, flows from the space between each passage portion and each electric heating wire heater 4 into the second case section 7, and similarly flows outside from the outflow port 14. As described above, the heat medium flows inside from the inflow port 13 due to its flow energy, and then passes to the downside. Therefore, the heat medium does not easily flow through the upper portion of the flow path 3. However, the plurality of cutout portions 11A are projected and formed in the upper portion (the upper half) of the upside passage portion 11 of the gasket 8. Therefore, the heat medium easily passes through the flow path, and portions where heat exchange is not easily performed are decreased. Furthermore, the cutout portions 11A also have an effect of decreasing a pressure loss.

As described above, according to the heating device 1 of the present invention, the flow of the heat medium in the flow path 3 is controlled by the gasket 8 which seals the space between the first case section 6 and the second case section 7 which constitute the case 2. Therefore, for the purpose of controlling the flow of the heat medium in the flow path 3, it is not necessary to dispose any special partition wall or to subject the electric heating wire heaters 4 to any special processing.

That is, the flow of the heat medium can be controlled by utilizing the gasket 8 which seals the space between the respective case sections 6 and 7, and hence it is possible to effectively perform the heat exchange between each of the electric heating wire heaters 4 and the heat medium while achieving decrease of the number of components and reduction of cost.

In addition, the electric heating wire heaters 4 are arranged along the space between both the case sections 6 and 7, and pass through the passage portions 11 and 12 formed in the wall section 9 of the gasket 8, so that the control of the flow of the heat medium by the gasket 8 is executed without hindrance.

Furthermore, in the above embodiment, the gasket 8 is provided with the wall section 9 positioned in the flow path 3 and the passage portions 11 and 12 opened in the wall section 9, and the enlarged-width portion 12A is formed in the lower portion of the downside passage portion 12 through which a larger part of the heat medium is to flow, to enlarge an opening dimension. Consequently, the heat medium is allowed to easily flow, thereby decreasing the pressure loss of the heat medium in the flow path 3. It is to be noted that a dimension of the enlarged-width portion 12A is set so that the pressure loss of the heat medium in the flow path 3 falls within an allowable range.

In consequence, it is possible to prevent the disadvantage that the pressure loss of the heat medium in the case 2 is excessively increased for the control of the flow of the heat medium by the gasket 8.

Additionally, the air is easily retained in the upper portion (a portion shown by a broken-like circle X in FIG. 2) of the flow path 3 in the case 2, but a water path width of the upside passage portion 11 is narrowed to heighten a flow speed of the heat medium. Therefore, the air which is to be retained in the flow path 3 of this portion can smoothly be pushed away. In consequence, it is possible to effectively prevent or inhibit generation of the air retention in the flow path 3 of the case 2. It is to be noted that the plurality of cutout portions 11A are projected and formed in the upper portion of the passage portion 11 as described above, so that the heat medium easily passes therethrough and the heat exchange between the same and the electric heating wire heater 4 is promoted. Furthermore, the pressure loss of the heat medium due to the narrowed water path width can be decreased.

Embodiment 2

Figure 7:
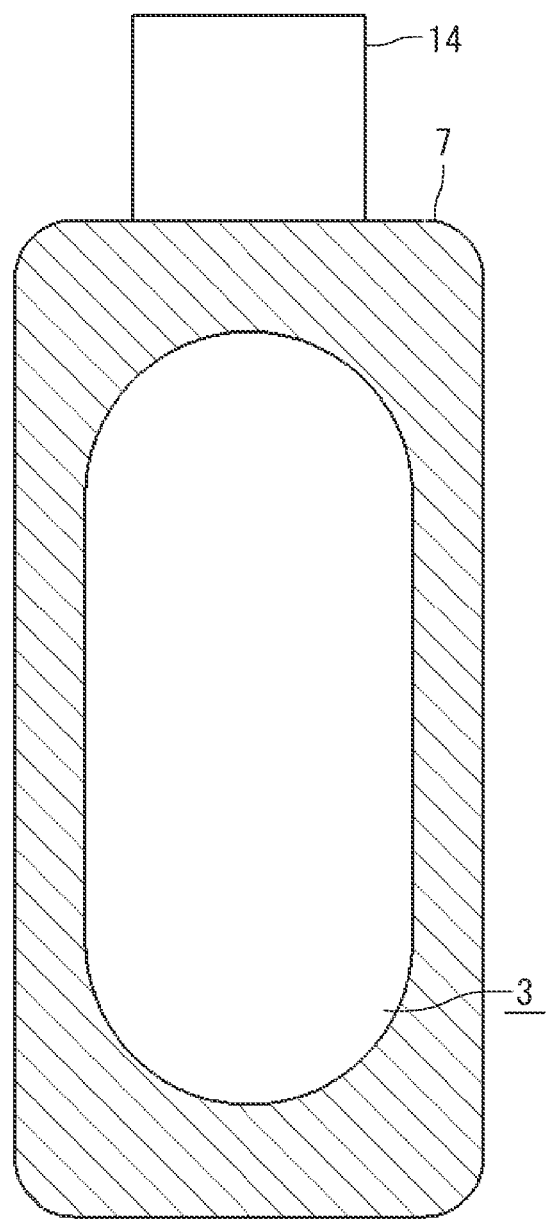
FIG. 7 is a side view of a first case section of a heating device of Embodiment 2 to which the present invention is applied.
Figure 8:
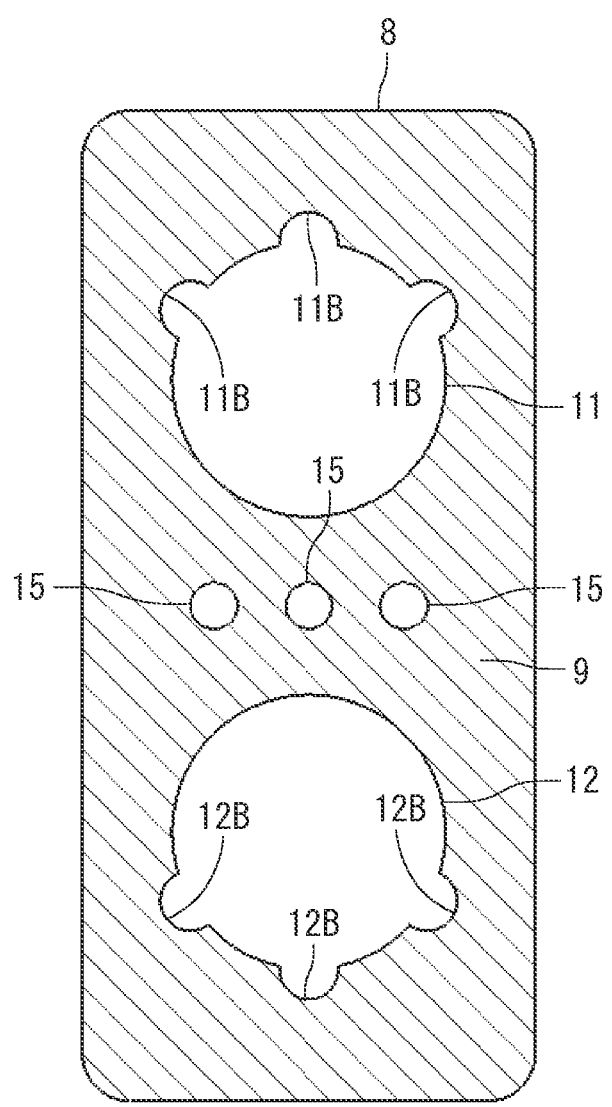
FIG. 8 is a front view of a gasket of the same embodiment 2.
Figure 9:
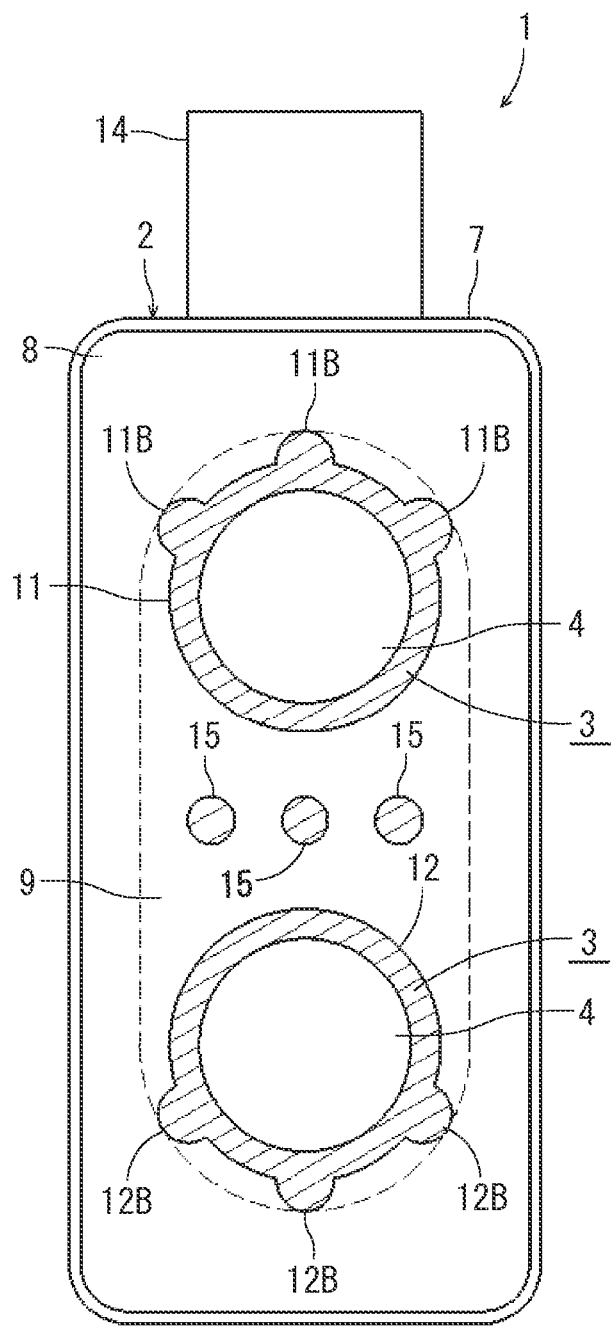
FIG. 9 is a view in which the gasket of FIG. 8 is allowed to face an end surface of a second case section of FIG. 7.

Next, FIG. 7 to FIG. 9 show another embodiment (Embodiment 2) of the heating device 1 of the present invention. It is to be noted that in the respective drawings, components denoted with the same reference numerals as in FIG. 1 to FIG. 6 produce the same or similar functions. In this case, a shape of a flow path 3 in each of case sections 6 and 7 is a substantially oblong shape as shown in FIG. 7.

Additionally, in this case, each of passage portions 11 and 12 of a gasket 8 possesses a circular shape larger than an outer diameter of each electric heating wire heater 4 so that a predetermined space is present between the passage portion and the electric heating wire heater. Furthermore, as shown in FIG. 8, a plurality of cutout portions 11B projecting to the outside are formed in an upper portion of the upside passage portion 11, and a plurality of cutout portions 12B projecting to the outside are formed also in a lower portion of the downside passage portion 12. The cutout portions 11B, 12B reach upper and lower circles of the flow path 3. In addition, three small-diameter passage portions 15 are formed between the respective passage portions 11 and 12 in the embodiment, and due to these passage portions, the gasket 8 possesses a vertically symmetric shape via a central horizontal line.

Due to such a shape and dimensional relation, a wall section 9 of the gasket 8 is positioned to project from opening end surfaces of the respective case sections 6 and 7 into the flow path 3 of a case 2, and the flow path 3 between each of the passage portions 11 and 12 and each of the electric heating wire heaters 4, 4 has such a sectional shape as shown by hatching in FIG. 9. That is, a cross section of the flow path 3 constituted in the downside passage portion 12 possesses a shape to surround the electric heating wire heater 4 via a predetermined space and project to the outside in a plurality of lower portions. In addition, a cross section of the flow path 3 constituted in the upside passage portion 11 possesses a shape to surround the electric heating wire heater 4 via a predetermined space and project to the outside in a plurality of upper portions. Furthermore, the passage portions 15 have a shape opened between the cross sections.

As described above, the gasket 8 is formed into the vertically symmetric shape, so that a flow rate of a heat medium flowing through the flow path 3 in the case 2 can vertically be uniformed. Additionally, in the same manner as described above, the cutout portions 11B of the passage portion 11 have a function of heightening a flow speed of the heat medium to push air to the outside. However, in this case, a pressure loss of the heat medium in the flow path 3 needs to be suppressed within an allowable range. The heat medium also flows through the passage portions 15, and hence a dimension of each of the passage portions 15 and the number of the passage portions are set so as to suppress the pressure loss within the allowable range.

Furthermore, the gasket 8 is formed into the vertically symmetric shape, and hence it is not necessary to mind top and bottom of the gasket 8 during attaching, which effectively improves a productivity.

Embodiment 3

Figure 10:
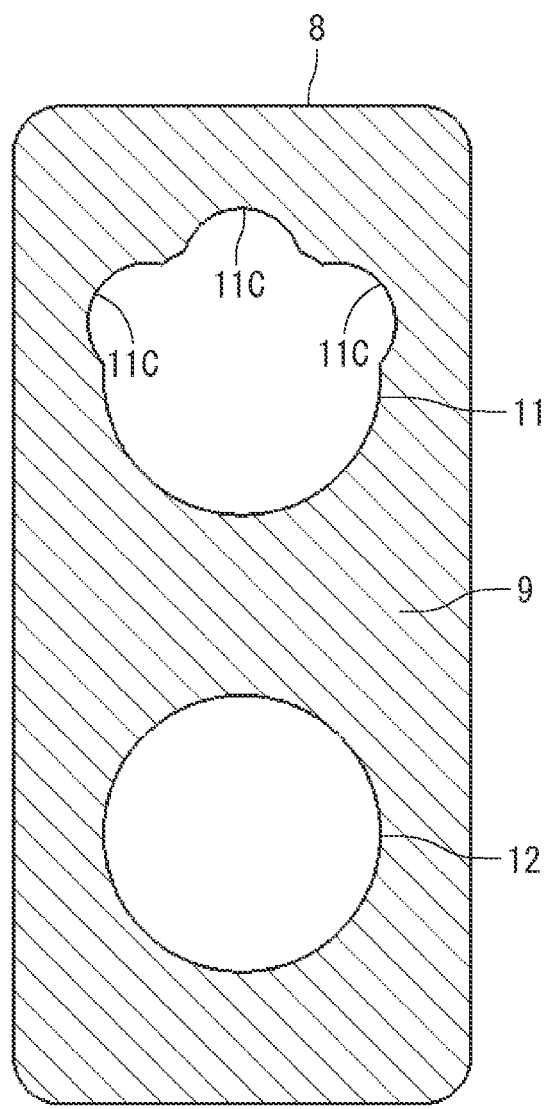
FIG. 10 is a front view of a gasket of a heating device of Embodiment 3 to which the present invention is applied.
Figure 11:
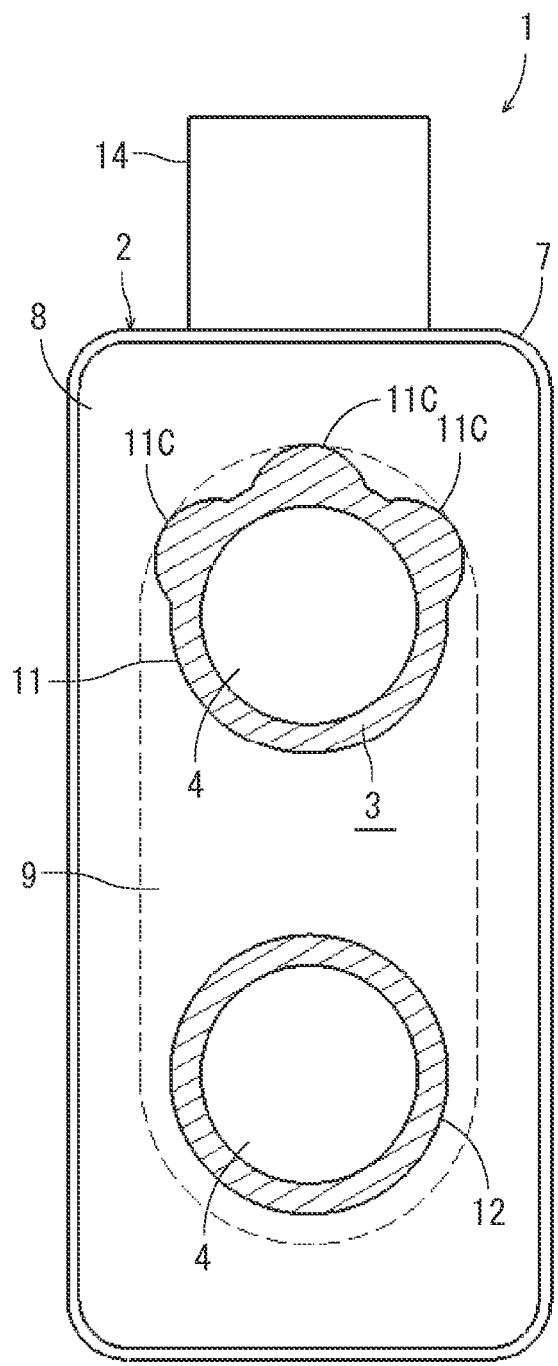
FIG. 11 is a view in which the gasket of FIG. 10 is allowed to face the end surface of the second case section of FIG. 7.
Figure 12:
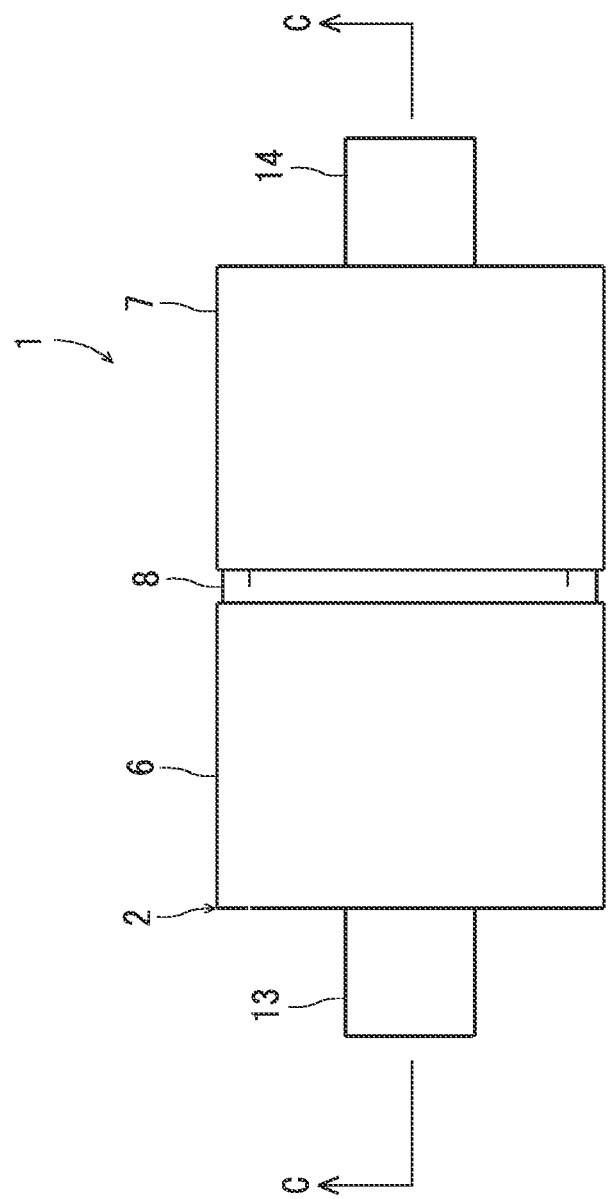
FIG. 12 is a plan view of a heating device of Embodiment 4 to which the present invention is applied.

Next, FIG. 10 and FIG. 11 show still another embodiment (Embodiment 3) of the heating device 1 of the present invention. It is to be noted that in the respective drawings, components denoted with the same reference numerals as in FIG. 1 to FIG. 9 produce the same or similar functions. Also in this case, a shape of a flow path 3 in each of case sections 6 and 7 is a substantially oblong shape as shown in FIG. 7.

Additionally, in this case, each of passage portions 11 and 12 of a gasket 8 possesses a circular shape larger than an outer diameter of each electric heating wire heater 4 so that a predetermined space is present between the passage portion and the electric heating wire heater. However, as shown in FIG. 10, a plurality of cutout portions 11C projecting to the outside are formed only in an upper portion of the upside passage portion 11, and the downside passage portion 12 is formed into a circular shape as it is. Furthermore, the cutout portions 11C reach an upside circle of the flow path 3.

Due to such a shape and dimensional relation, a wall section 9 of the gasket 8 is positioned to project from an opening end surface of each of the case sections 6 and 7 into the flow path 3 of a case 2, and the flow path 3 between each of the passage portions 11 and 12 and each of electric heating wire heaters 4, 4 has such a sectional shape as shown by hatching in FIG. 11. That is, a cross section of the flow path 3 constituted in the downside passage portion 12 has a ring shape to surround the electric heating wire heater 4 via a predetermined space. On the other hand, a cross section of the flow path 3 constituted in the upside passage portion 11 has a shape to surround the electric heating wire heater 4 via a predetermined space and project to the outside in a plurality of upper portions as the cutout portions 11C.

The gasket 8 is formed into such a shape, and hence an opening dimension of the upper portion of the upside passage portion 11 is enlarged. Therefore, due to such flow energy as described above, a heat medium easily flows in the upper portion of the flow path 3 in which the heat medium flows less easily than in a lower portion thereof. Also according to such a method, a flow rate of the heat medium can be uniformed, and the heat medium can efficiently be heated by the electric heating wire heaters 4. However, also in this case, especially the space between the passage portion 12 and the electric heating wire heater 4 is set so as to suppress a pressure loss of the heat medium in the flow path 3 within an allowable range.

Embodiment 4

Next, FIG. 12 to FIG. 17 show a further embodiment (Embodiment 4) of the heating device 1 of the present invention. It is to be noted that in the respective drawings, components denoted with the same reference numerals as in FIG. 1 to FIG. 11 produce the same or similar functions. Also in this case, one side surface of each of case sections 6 and 7 constituting a case 2 is opened, and respective openings are made to abut on each other via a gasket 8 to fix the case sections by bolts. However, projecting wall sections 36 and 37 are formed to project to the openings via peripheral spaces from centers of the other side surfaces of the case sections 6 and 7, respectively, and are made to abut on each other.

In addition, electric heating wire heaters 4 are arranged in the case sections 6 and 7 so as to pass through the projecting wall sections 36 and 37, respectively. Furthermore, an inflow port 13 is formed at a position closer to one side of the other side surface of the first case section 6, and an outflow port 14 is formed at a position closer to the other side of the other side surface of the second case section 7. Additionally, the gasket 8 is positioned between the respective electric heating wire heaters 4, and a square passage portion 41 through which abutment portions of the projecting wall sections 36 and 37 pass and passage portions 42, 43 formed in the left and right of the square passage portion and constituted of round holes are formed to pass through a wall section 9 of the gasket.

Figure 16:
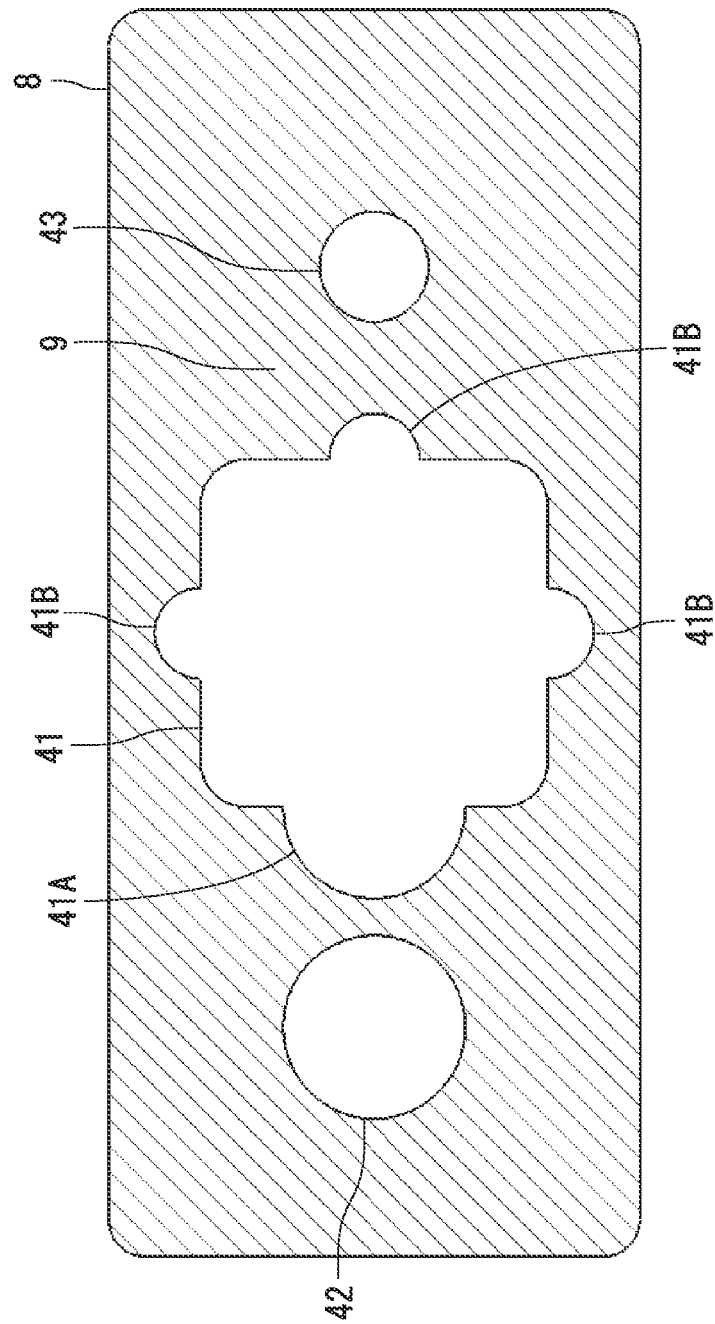
FIG. 16 is a front view of a gasket of the heating device of FIG. 12.

In this case, as shown in FIG. 16, a predetermined space is formed between the passage portion 41 of the gasket 8 and each of the projecting wall sections 36 and 37. Furthermore, semicircular cutout portions 41A and 41B are formed in four sides of the passage portion 41, and the cutout portion 41A positioned on an outflow port 14 side is formed to be larger (have a larger opening dimension) than the other cutout portions 41B. In addition, the passage portion 42 positioned on the outflow port 14 side is constituted in a larger diameter (a larger opening dimension) than the passage portion 43 positioned on an inflow port 13 side.

Due to such a dimensional relation, also in this case, the wall section 9 of the gasket 8 is positioned to project from opening end surfaces of the respective case sections 6 and 7 into a flow path 3 of the case 2, and the flow path 3 in the respective passage portions 41 to 43 and between the projecting wall sections 36 and 37 has such a sectional shape as shown by hatching in FIG. 17. That is, the flow path possesses a shape larger on the outflow port 14 side than on the inflow port 13 side. In consequence, there is constituted, in the case 2, the flow path 3 of a heat medium which enters from the inflow port 13, passes through the respective passage portions 41 to 43 of the gasket 8 from a space between each of upper and lower walls of the first case section 6 and each of the electric heating wire heater 4 and the projecting wall section 36, and reaches the outflow port 14 from a space between each of upper and lower walls of the second case section 7 and each of the electric heating wire heater 4 and the projecting wall section 37.

Figure 13:
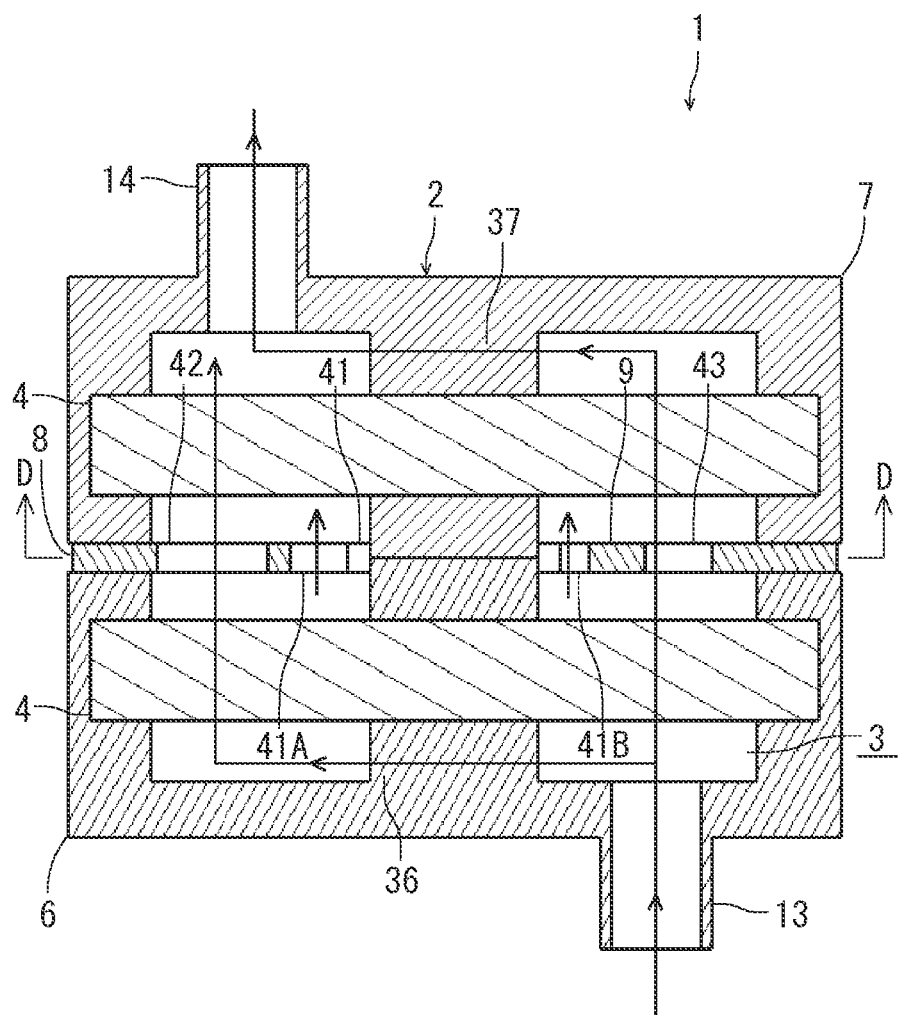
FIG. 13 is a sectional view taken along the C-C line of FIG. 12.
Figure 14:
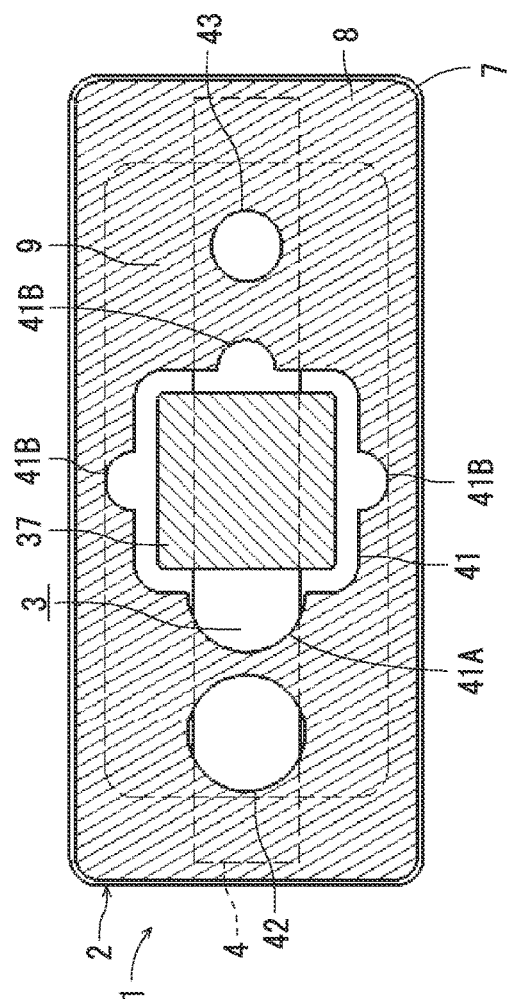
FIG. 14 is a sectional view taken along the D-D line of FIG. 13.
Figure 15:
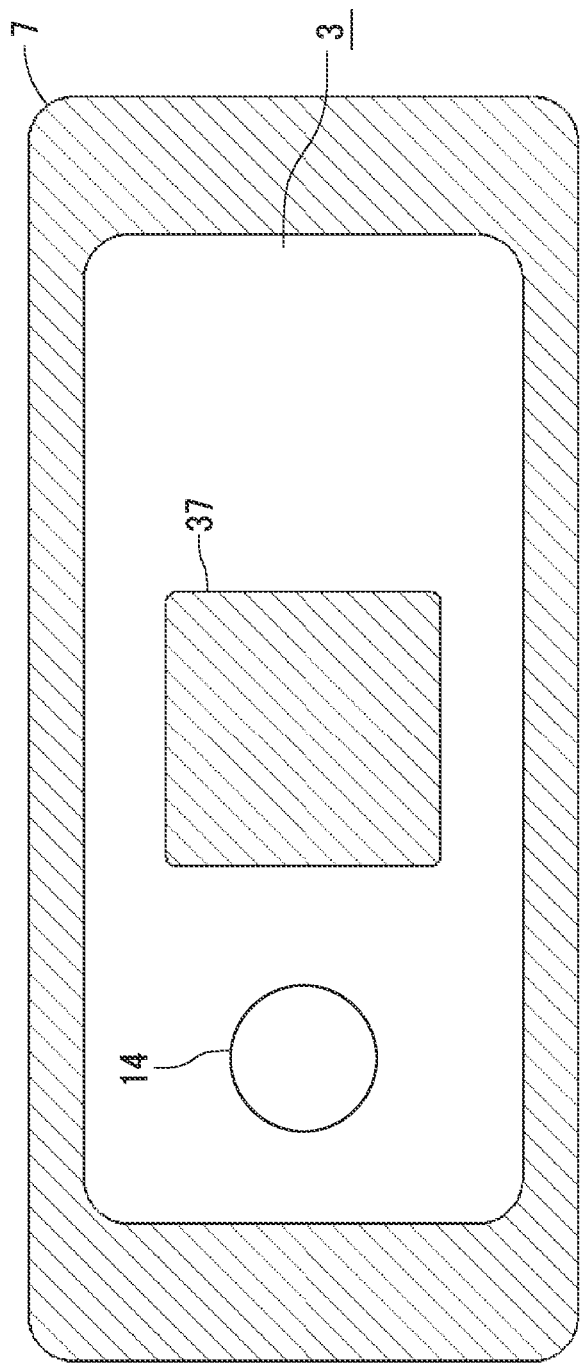
FIG. 15 is a side view of a second case section of the heating device of FIG. 12.

In the above constitution, the heat medium flows from the inflow port 13 into the flow path 3 in the case 2, passes through the flow path 3 and flows outside from the outflow port 14 by an unshown pump or the like as shown by arrows in FIG. 13. At this time, a larger part of the heat medium which has flowed from the inflow port 13 into the first case section 6 is to pass through the passage portion 43 of the gasket 8 and the cutout portions 41B of the passage portion 41 due to its flow energy. However, the passage portion 43 and the passage portion 41B have a smaller opening dimension than the passage portion 42 and the cutout portion 41A on the outflow port 14 side, and hence about a half of the heat medium cannot pass through the flow path. Therefore, the heat medium which cannot pass through the flow path flows toward the passage portion 42 and the cutout portion 41A.

Furthermore, the heat medium passes around the electric heating wire heaters 4 in the first case section 6, enters into the second case section 7 through the passage portions 41 to 43 (including the space between each of the projecting wall sections 36 and 37 and the gasket 8), and passes around the electric heating wire heaters 4 in the second case section 7 to finally flow outside from the outflow port 14.

As described above, also in this case, according to the heating device 1, the flow of the heat medium in the flow path 3 is controlled by the gasket 8 which seals the space between the first case section 6 and the second case section 7 constituting the case 2. Therefore, for the purpose of controlling the flow of the heat medium in the flow path 3, it is not necessary to dispose any special partition wall or to subject the electric heating wire heaters 4 to any special processing.

That is, the flow of the heat medium can be controlled by utilizing the gasket 8 which seals the space between the respective case sections 6 and 7, and hence it is possible to effectively perform heat exchange between the electric heating wire heater 4 and the heat medium while achieving decrease of the number of components and reduction of cost. Particularly, in the embodiment, the opening dimensions of the passage portion 43 and the cutout portions 41B on the inflow port 13 side where the heat medium easily flows due to its flow energy are larger than those of the passage portion 42 and the cutout portion 41A on the outflow port 14 side. Therefore, the flow of the heat medium in the flow path 3 can be uniformed, and the heat exchange between each electric heating wire heater 4 and the heat medium can efficiently be performed. As a result, a surface temperature of the electric heating wire heater 4 is prevented from locally rising, and hence life of the electric heating wire heater 4 can be lengthened. Additionally, in this embodiment, the electric heating wire heaters 4 are arranged in the case sections 6 and 7, respectively, but the gasket 8 is positioned between the respective electric heating wire heaters 4. Therefore, the space between the case sections 6 and 7 can be sealed and the control of the flow of the heat medium can be realized without hindrance.

It is to be noted that in the above respective embodiments, the wall section 9 of the gasket 8 is positioned in the flow path 3. That is, the flow path 3 is once divided into the first case section 6 side and the second case section 7 side by the wall section 9, and in the wall section 9, the passage portions 11, 12, 15 and 41 to 43 through which the heat medium passes are formed, so that the flow of the heat medium is controlled by the opening dimensions and shapes of the passage portions. However, the present invention is not limited to this example, and a part of the wall section 9 of the gasket 8 may be positioned to project from the end surfaces of the case sections 6 and 7 into the flow path 3. In this case, portions other than the part of the projected wall section 9 of the gasket 8 perform a function of the passage portions.

In addition, this projected part may be tilted to a flow direction of the heat medium, and the flow may be controlled by regulating ease of flowing. That is, a shape of each passage portion includes such tilt of the part of the wall section 9 of the gasket 8, and the like.

Furthermore, the number of the electric heating wire heaters 4 and the number and shapes of the respective passage portions of the gasket 8 are not limited to those of the above respective embodiments. In addition, a heating element other than the electric heating wire heaters of the embodiments can be applied as the heating element, and a fluid other than water may be used as the heat medium. However, when the inexpensive general-use electric heating wire heater 4 is used, manufacturing cost of the heating device 1 can be reduced, and a reliability thereof can be improved.

Additionally, when the heating device 1 of the present invention is incorporated in the air conditioning device for a vehicle such as the hybrid car or the electric car, improvement of performances of the air conditioning device provided with the cooling water circuit and the vehicle on which the device is mounted can be achieved, but needless to say, the heating device 1 can be utilized as the heat source of another use application except the air conditioning device for the vehicle.

DESCRIPTION OF REFERENCE NUMERALS

1: heating device
2: case
3: flow path
3C: enlarged-width portion
4: electric heating wire heater (heating element)
6: first case section
7: second case section
8: gasket
9: wall section
11, 12, 15, 41, 42, and 43: passage portion
11A, 11B, 11C, 41A, and 41B: cutout portion
12A: enlarged-width portion
13: inflow port
14: outflow port

The invention claimed is:
1. A heating device,
wherein the heating device is constituted of a case including therein a flow path through which a heat medium flows, and a heating element disposed in the flow path of the case to heat the heat medium,
wherein the case comprises a first case section and a second case section each of which has at least one opened surface and which are connected to each other in a state where respective openings are made to abut on each other, and a plate-like gasket which is interposed between abutment portions of the first case section and the second case section, and seals a space between both the case sections,
wherein at least a part of the gasket is positioned in the flow path, to control the flow of the heat medium in the flow path,
wherein the gasket has a wall section positioned in the flow path, and a passage portion opened in the wall section, and
wherein in the gasket, the flow path of a portion where air is easily retained in the case is narrowed by an opening dimension and/or a shape of the passage portion formed in the wall section.

2. The heating device according to claim 1,
wherein the gasket has cutout portions projected and formed in an upper portion of the passage portion positioned in an upper portion of the flow path.

3. The heating device according to claim 1,
wherein in the gasket, the flow path of a portion where the heat medium does not easily flow in the case is enlarged by an opening dimension and/or a shape of the passage portion formed in the wall section.

4. The heating device according to claim 1,
wherein the opening dimension and/or the shape of the passage portion formed in the wall section of the gasket is set so that a pressure loss of the heat medium in the flow path falls within an allowable range.

5. The heating device according to claim 1,
wherein the heating element is disposed along the space between both the case sections, and the heating element passes through a passage portion formed in the wall section of the gasket.

6. The heating device according to claim 1,
wherein the heating elements are arranged in the case sections, respectively, and the gasket is positioned between the respective heating elements.

7. The heating device according to claim 1,
wherein the heat medium is an antifreezing solution which flows through a vehicle heating water circuit.

8. The heating device according to claim 2,
wherein in the gasket, the flow path of a portion where the heat medium does not easily flow in the case is enlarged by an opening dimension and/or a shape of the passage portion formed in the wall section.

9. The heating device according to claim 8,
wherein the opening dimension and/or the shape of the passage portion formed in the wall section of the gasket is set so that a pressure loss of the heat medium in the flow path falls within an allowable range.

10. The heating device according to claim 9,
wherein the heating element is disposed along the space between both the case sections, and the heating element passes through the passage portion formed in the wall section of the gasket.

11. The heating device according to claim 9,
wherein the heating elements are arranged in the case sections, respectively, and the gasket is positioned between the respective heating elements.

12. The heating device according to claim 6,
wherein the heat medium is an antifreezing solution which flows through a vehicle heating water circuit.

13. The heating device according to claim 1,
wherein in the gasket, the flow path of a portion where the heat medium does not easily flow in the case is enlarged by an opening dimension and/or a shape of the passage portion formed in the wall section.

14. The heating device according to claim 1,
wherein the opening dimension and/or the shape of the passage portion formed in the wall section of the gasket is set so that a pressure loss of the heat medium in the flow path falls within an allowable range.

15. The heating device according to claim 1,
wherein the heating element is disposed along the space between both the case sections, and the heating element passes through the passage portion formed in the wall section of the gasket.

16. The heating device according to claim 1,
wherein the heating elements are arranged in the case sections, respectively, and the gasket is positioned between the respective heating elements.

17. The heating device according to claim 1,
wherein the heat medium is an antifreezing solution which flows through a vehicle heating water circuit.

18. The heating device according to claim 2,
wherein the opening dimension and/or the shape of the passage portion formed in the wall section of the gasket is set so that a pressure loss of the heat medium in the flow path falls within an allowable range.

* * * * *